July 21 1925.                 1,546,976
G. F. FISHER
AUTOMATIC ANIMAL TRAP
Filed Jan. 15, 1925      3 Sheets-Sheet 2

July 21, 1925.

G. F. FISHER

AUTOMATIC ANIMAL TRAP

Filed Jan. 15, 1925

Inventor
George F. Fisher.

Eugene C. Brown
Attorney

Patented July 21, 1925.

1,546,976

UNITED STATES PATENT OFFICE.

GEORGE F. FISHER, OF LEEDEY, OKLAHOMA.

AUTOMATIC ANIMAL TRAP.

Application filed January 15, 1925. Serial No. 2,564.

*To all whom it may concern:*

Be it known that I, GEORGE F. FISHER, a citizen of the United States, residing at Leedey, in the county of Dewey and State of Oklahoma, have invented certain new and useful Improvements in Automatic Animal Traps, of which the following is a specification.

This invention relates to animal traps and has special reference to a cage trap so arranged that it is automatically reset after each operation.

The principal objects of this invention are to provide a novel form of such trap wherein a rat entering the first chamber of the trap will effect actuation of a trip device and permit displacement of said chamber; to automatically effect removal or opening of a door between said first chamber and a second chamber upon displacement of the first chamber, and to display bait in a novel manner.

The invention will now be described in detail, particularly pointed out in the claim and illustrated in the drawings, wherein:

Figure 1:
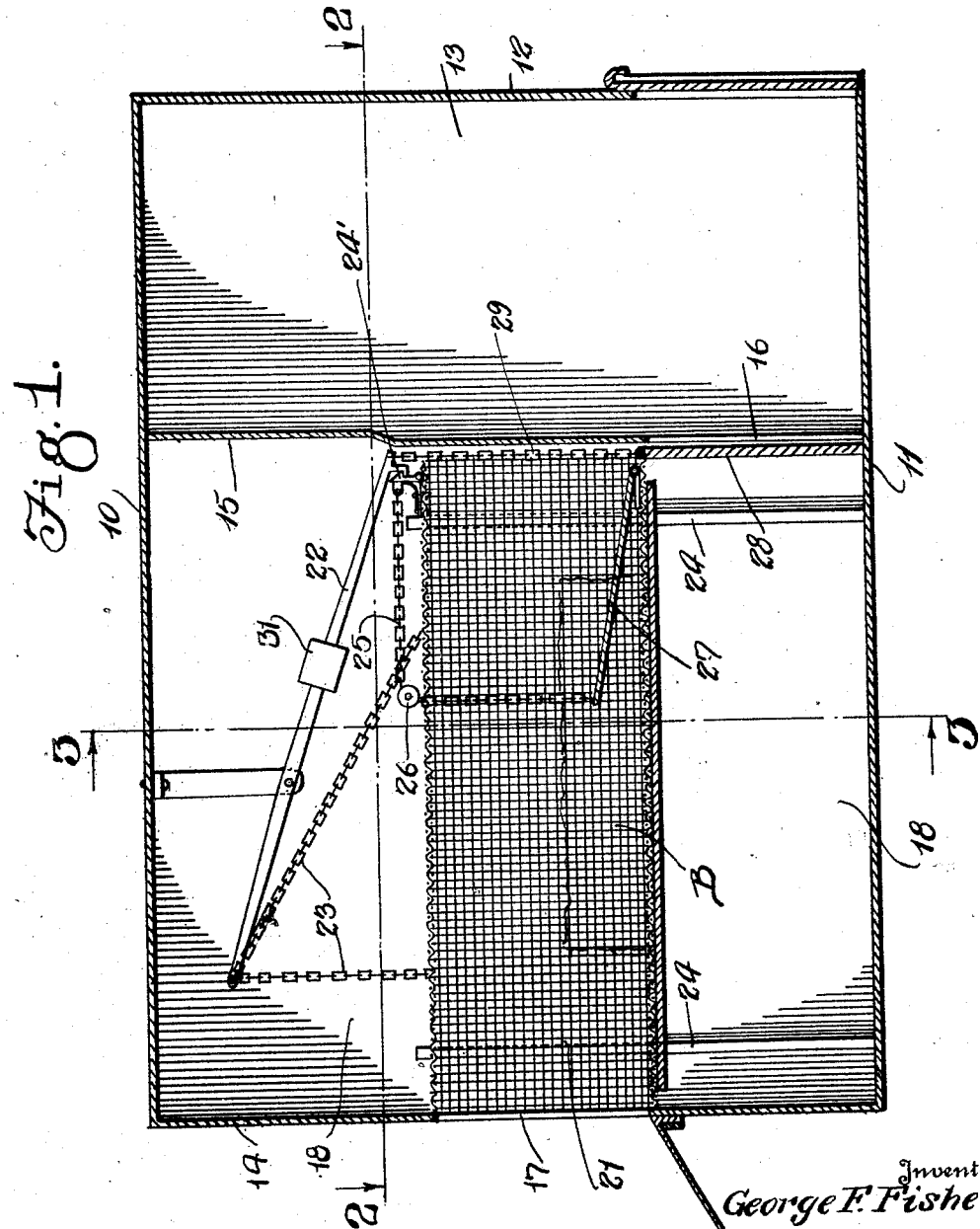
Figure 1 is a longitudinal vertical median section through the device.
Figure 2:
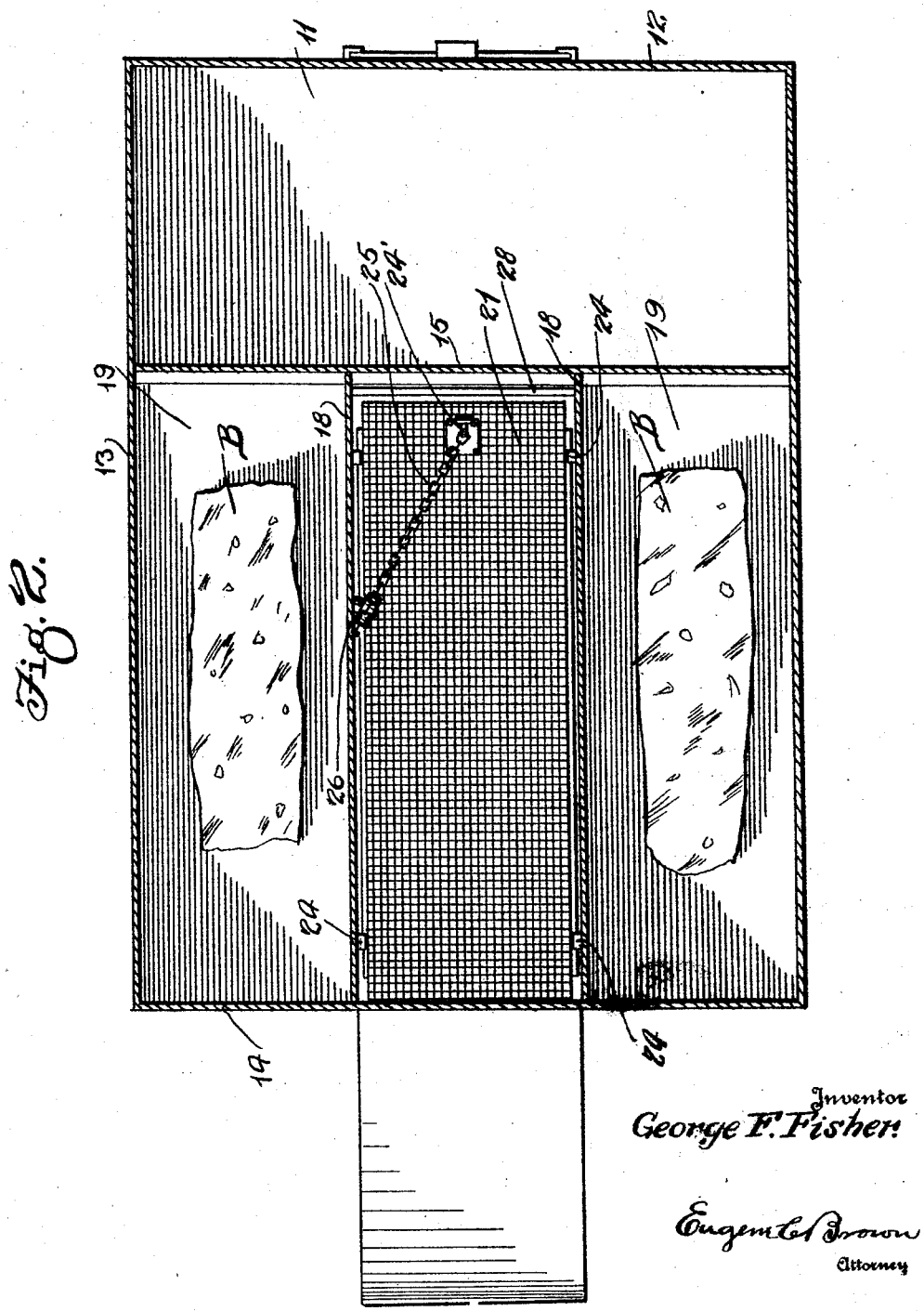
Figure 2 is a horizontal section on the line 2—2 of Figure 1.
Figure 3:
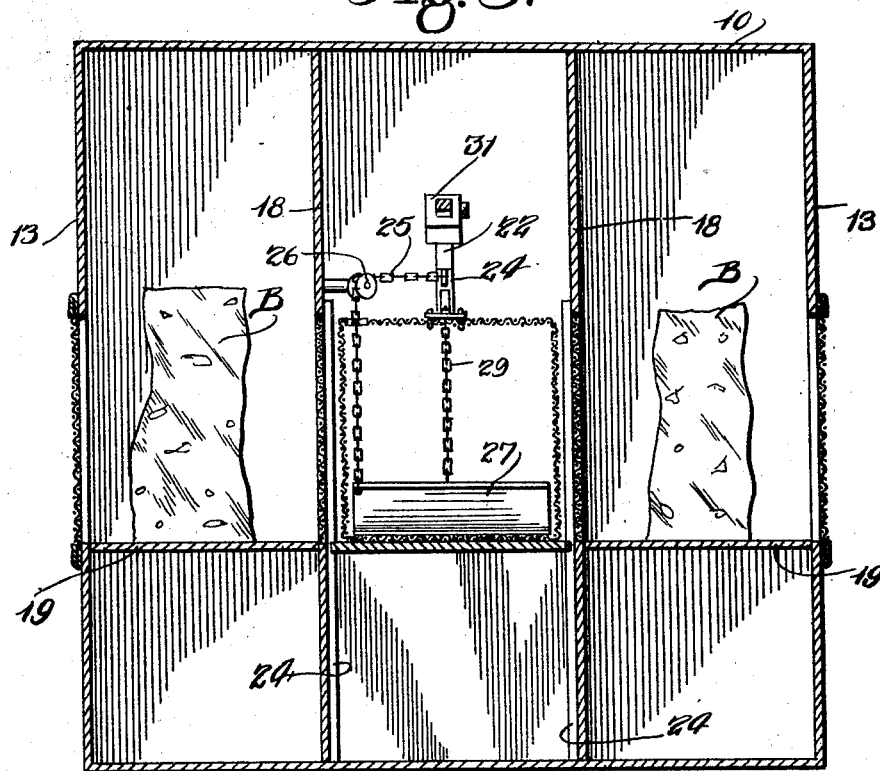
Figure 3 is a section on the line 3—3 of Figure 1.
Figure 4:
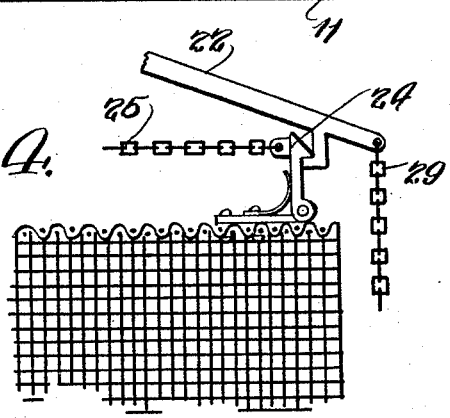
Figure 4 is a detail, to large scale, of the trip used herewith.

The trap is of elongated box shape and has a top 10, bottom 11, rear wall 12, side wall 13 and front 14. The bottom is preferably imperforate while the rear and top may be either imperforate or made of screen wire. Between the front and rear walls a transverse partition 15 extends across the trap to divide it into front and back compartments which are in communication with each other through an opening 16 located in the bottom part of the partition intermediate the side walls.

In the front wall, about the center thereof there is an access opening 17 and at each side of this access opening there is a longitudinal partition 18 which extends from said front wall to the partition 15, the opening 16 being located between these longitudinal partitions. Just below the bottom of the opening 17 is a pair of horizontal partitions 19 each of which is located between one of the longitudinal partitions and the adjacent side wall which is reticulated just above the level of this floor so that bait B laid on these floors may be observed from the exterior of the trap. The usual access doors are provided for the rear compartment and the two bait compartments thus formed.

Within the space between the two longitudinal partitions is a rectangular elevator cage 21 open at each end and formed of reticulated material. Above this cage is arranged a lever 22 pivoted intermediate its ends and having its forward end connected to the elevator by a bridle 23 and guides 24 are provided so that the elevator may move up and down in its compartment without tilting, its upward position bringing its open front end into registry with the opening 17 and its lower position bringing its open rear end into registry with the opening 16. The other end of the lever 22 is arranged to be engaged by a suitable latch 24' which is here shown as a spring latch, but which may be of any preferred type. This latch is released at the proper time by means of a chain 25 which runs over a pulley 26 carried by the top of the elevator cage and there down to a connection with the rear normally elevated end of a treadle 27 which has its front edge pivotally connected with the front part of the elevator cage bottom.

A vertically sliding door 28 normally covers the opening 16 and is connected to the front of the elevator cage by a chain 29 running to the lever 22 so that the door acts, in a measure, as a counter balance for the chain, the door being assisted in this counterbalancing function by a weight 31 adjustable along the forward arm of the lever 22.

An inclined platform or ramp runs up to the opening 17 and is there hinged so that it may be turned up against the trap for transportation.

In operation, an animal, seeing the bait through the reticulated portions of the side walls ascends the ramp and enters the elevator cage. As it moves to the back of the cage it steps on the treadle and thus releases the latch. The elevator cage then descends under the influence of the weight of the animal thus raising the door 28. The front of the elevator cage will at this time be closed by the lower part of the front wall of the trap while access is afforded to the rear compartment of the trap through the opening 16. The animal then passes into this part of the trap and the elevator cage rises and is caught by the latch, thus setting it for a second animal.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

A rat trap consisting of a cage like outer structure having a normally open front door and a vestibule leading therefrom, a partition at the rear of the vestibule having a raised opening therein, a second partition spaced rearwardly of the first and having an opening therein displaced downwardly with relation to the opening in the first partition, an elevator cage between said partitions and having open ends, said cage being movable to bring the openings in the respective ends into and out of registry with the respective partition openings, a door for the opening in the second partition and constituting a counterweight for the elevator, a lever pivoted at an intermediate point and having its opposite ends connected to the cage and to the door respectively, and a latch secured to the cage adapted to engage a member on the end of the lever attached to the counterweight when the cage is in its uppermost position, and a trip treadle in said cage and connected to the latch device to release the latter upon depression of the treadle.

In testimony whereof I affix my signature.

GEORGE F. FISHER.